United States Patent [19]
Godlove et al.

[11] Patent Number: 4,806,975
[45] Date of Patent: Feb. 21, 1989

[54] ERASE LAMP WITH PLURAL ELECTRODES

[75] Inventors: Ronald E. Godlove, Bergen; Robert L. Thompson; Charles J. Urso, Jr., both of Webster, all of N.Y.

[73] Assignee: Xerox Corporation, Stamford, Conn.

[21] Appl. No.: 88,365

[22] Filed: Aug. 24, 1987

[51] Int. Cl.⁴ ..................... G03G 15/00; G03B 27/54; H01J 1/46; H01J 17/00

[52] U.S. Cl. ..................................... 355/7; 355/14 E; 355/70; 313/307; 313/581

[58] Field of Search ....................... 355/7, 8, 14 E, 69, 355/70, 14 D; 313/581, 306, 307, 110; 315/167, 169.4

[56] References Cited

U.S. PATENT DOCUMENTS

| | | | |
|---|---|---|---|
| 2,822,496 | 2/1958 | Maurer | 313/581 |
| 3,556,655 | 1/1971 | Lux et al. | 355/55 |
| 3,685,894 | 8/1972 | Lux et al. | 355/3 |
| 3,751,155 | 8/1973 | Liechty | 355/3 |
| 3,811,061 | 5/1974 | Nakayama et al. | 313/109 |
| 3,827,803 | 8/1974 | Shelffo et al. | 355/3 R |
| 3,940,757 | 2/1976 | Purchase | 340/324 M |
| 3,967,893 | 7/1976 | Majewicz | 355/4 |
| 4,255,042 | 3/1981 | Armitage, Jr. et al. | 355/70 X |
| 4,478,504 | 10/1984 | Tanaka | 355/8 X |
| 4,539,513 | 9/1985 | Ganser et al. | 315/176 |
| 4,701,670 | 10/1987 | Watanabe et al. | 355/69 X |

FOREIGN PATENT DOCUMENTS

| | | | |
|---|---|---|---|
| 170439 | 10/1982 | Japan | 313/581 |
| 135927 | 7/1985 | Japan | 355/14 E |
| 202459 | 10/1985 | Japan | 355/14 D |

*Primary Examiner*—A. T. Grimley
*Assistant Examiner*—Ed Pipala
*Attorney, Agent, or Firm*—H. Fleischer; J. E. Beck; R. Zibelli

[57] ABSTRACT

A lamp system which erases selected portions of an electrically charged photoconductive member. The lamp has a transparent housing defining a chamber filled with a gaseous medium. A charge is induced across a selected region of the gaseous medium. This causes the gaseous medium to ionize in the selected region so as to emit light rays thereat. The light rays illuminate the electrically charged photoconductive member in the selected region to discharge the charge thereat.

13 Claims, 2 Drawing Sheets

ERASE LAMP WITH PLURAL ELECTRODES

This invention relates generally to an electrophotographic printing machine, and more particularly concerns a lamp for erasing selected areas of a charged photoconductive member.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational area contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In this process, certain area of the photoconductive member are charged and not used for imaging. These charged, unused areas are subsequently developed with toner particles. Inasmuch as these toner particles are not transferred to the copy sheet, they must be cleaned from the photoconductive member prior to the next succesuve imaging cycle or they will degrade the copy. Alternatively, if these non-image regions are not charged, or if they are discharged before development, the non-image areas of the photoconductive member will not be developed with toner particles and there is no requirement to clean the photoconductive member. The non-image areas on the photoconductive member requiring discharge are the interdocument area and the edge areas. The interdocument areas are the non-image areas before the first electrostatic latent image, between adjacent latent images, and after the last latent image of a series of latent images recorded on the photoconductive member. The edge areas are the non-image areas adjacent the sides of the latent image recorded on the photoconductive member If the original document is edge registered, then one edge of the latent image will always be aligned with one edge of the photoconductive member, and only one side need be erased. When the electrophotographic printing machine is capable of varying the magnification of the copy, the size of the non-image areas changes. For example, if a reduced size image is made, the interdocument area and one or both of the edge areas increase in size.

In order to erase the charged interdocument area, an erase lamp extending across the the photoconductive member perpendicular to the path of movement is energized for a selected time period as a function of the velocity of the photoconductive member so as to illuminate the entire interdocument area. The selected time of energization varies as a function of the size of the interdocument area. Edge erase requires that the length of the erase light be adjusted to compensate for different size images. Previously, this was achieved by the use of multiple lamps or shutters. The problem of erasing areas has been recognized in early copiers. For example, the Xeron Model Number 7000 used an elongated electroluminescent (phosphor glow) strip lamp with selectably illuminatable segments to discharge a selected portion of one edge area of the photoconductive member in response to the operator selection of letter or legal size copy paper. Other copiers, such as the Xerox Model Number 1050 use a plurality of neon lamps extending across the photoconductive member perpendicular to its' direction of movement. Interdocument erase is achieved by energizing all of the lamps for a preset time. Edge erase is accomplished by energizing selected lamps on either side of the latent image to erase the edge areas. It is evident that some configurations require many erase lamps to be positioned about the periphery of the photoconductive member to selectively discharge non-image areas. In some cases, as many as five individual lamps are used. Of course, this generates additional heat, and is more costly and less reliable.

Various other approaches have been devised for erasing charged areas of the photoconductive member. The following disclosures appear to be relevant:

U.S. Pat. No. 3,556,655
Patentee: Lux et al.
Issued: Jan. 19, 1971
U.S. Pat. No. 3,685,894
Patentee: Lux et al.
Issued Aug. 22, 1972
U.S. Pat. No. 3,751,155
Patentee: Liechty
Issued: Aug. 7, 1973
U.S. Pat. No. 3,811,061
Patentee: Nakayama et al.
Issued: May 14, 1974
U.S. Pat. No. 3,827,803
Patentee: Shelffo et al.
Issued: Aug. 6, 1974
U.S. Pat. No. 3,940,757
Patentee: Purchase
Issued: Feb. 24, 1976
U.S. Pat. No. 3,967,893
Patentee: Majewicz
Issued: July 6, 1976
U.S. Pat. No. 4,539,513
Patentee: Ganser et al.
Issued: Sept. 3, 1985

The relevant portions of the foregoing patents may be summarized as follows:

Lux et al ('655) and Lux et al ('894) disclose edge exposure lamps which are partially masked to illuminate only the non-image edge areas.

Liechty described fluorescent lamps which illuminate the side edges in the non-image areas.

Nakayama et al. discloses a plane surface discharge plasma display panel, wherein electrode pairs are provided on a base plate covered with a dielectric layer and impressed between glass or like plates. Chambers containing gas, such as Neon, are formed between the plates in combination with each pair of electrodes. An AC voltage source establishes an alternate electric field between the electrodes of a selected pair.

Shelffo et al. discloses a line of incandescent lamps extending transverse to the direction of movement of a master sheet. The lamps are selectively illuminated as a function of the size of the copy desired so as to fully illuminate the non-image area.

Purchase discloses an optical display in which photoconductive elements are illuminated by gas discharge elements having rows of discharge chambers containing gas which luminesces in the presence of an electric discharge. Each row is divided into groups with a first electrode extending along the length of a row while a second transparent electrode is associated with each group. Voltage pulses are supplied to the electrodes for ionizing the gas.

Majewicz describes an array of light emitting diodes for discharging non-image regions of the charged photoconductive member.

Ganser et al. described a circuit for starting and operating a high pressure gas discharge lamp. A full wave rectifier circuit is connected to an alternating voltage source for providing a pulsatory direct current for ionizing the gas discharge lamp.

In accordance with one aspect of the present invention, there is provided a lamp for erasing selected portions of an electrically charged photoconductive member. The lamp includes a substantially transparent housing defining a chamber having a gaseous medium disposed therein. Means induce an electrical field across a selected region of the gaseous medium. The gaseous medium ionizes in the selected region and emits light rays. These light rays illuminate the electrically charged photoconductive member in the selected region to discharge the charge thereat.

Pursuant to another aspect of the features of the present invention, there is provided an electrophotographic printing machine of the type in which a light source is employed to discharge selected portions of a charged photoconductive member adapted to have successive electrostatic latent images recorded thereon. The improved light source includes a substantially transparent housing defining a chamber having a gaseous medium disposed therein. Means induce an electrical field across a selected region of the gaseous medium. The gaseous medium ionizes in the selected region and emits light rays. These light rays illuminate the electrically charged photoconductive member in the selected region to discharge the charge thereat.

Other aspects of the present invention will becoome apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

Figure 1:
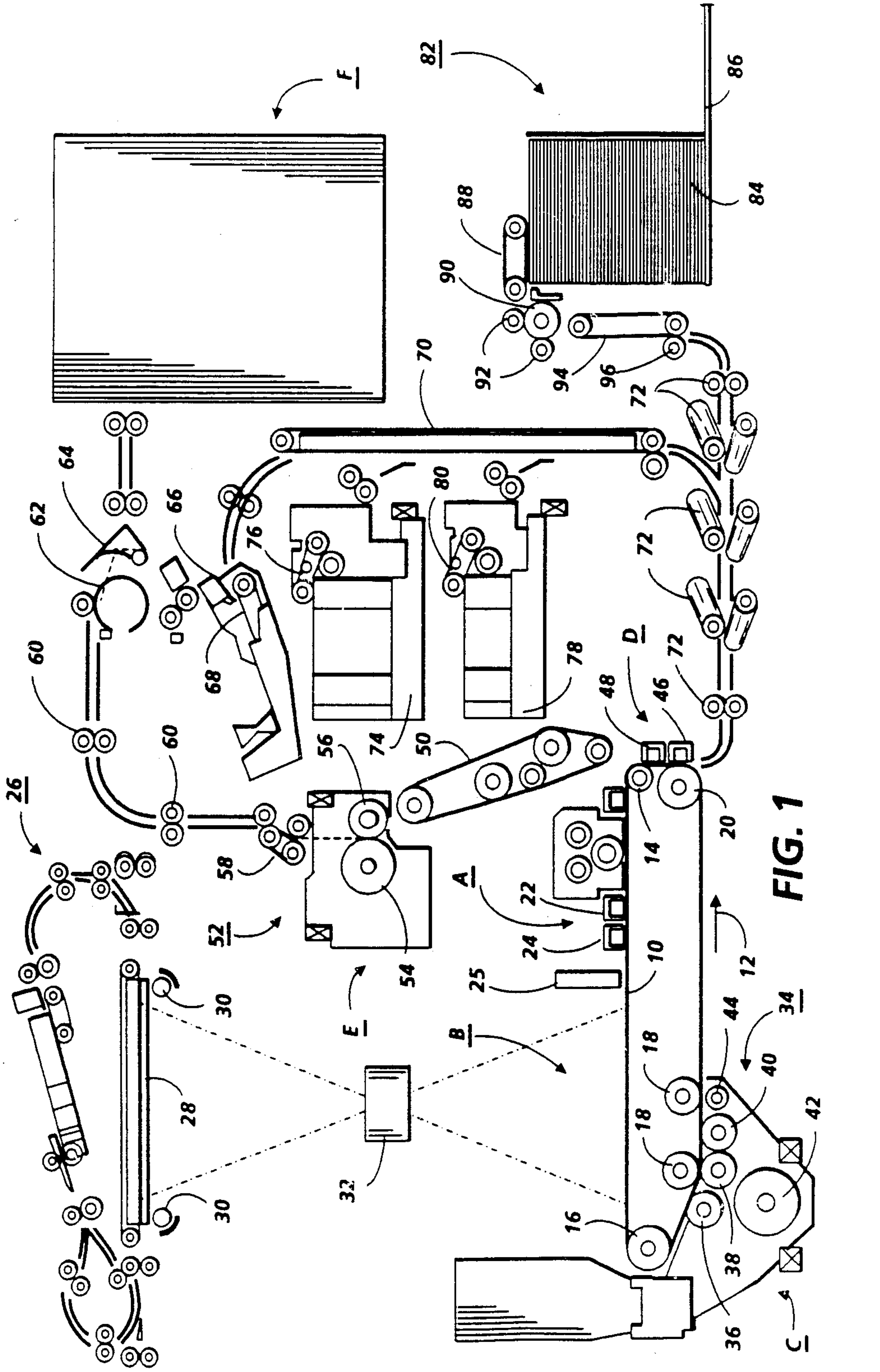
FIG. 1 is a schematic elevational view depicting an illustrative electrophotographic printing machine incorporating the erase lamp of the present invention therein.

For a general understanding of the features of the present invention, reference is made to the drawings. In the drawings, like reference numerals have been used throughout to identify identical elements. FIG. 1 schematically depicts an electrophotographic printing machine incorporating the features ot the present invention therein. It will become evident from the following discussion that the erase lamp of the present invention may be employed in a wide variety of electrophotographic printing machines and is not specifically limited in its application to the particular embodiment depicted herein.

Referring to FIG. 1 of the drawings, the electrophotographic printing machine employs a photoconductive belt 10. Preferably, the photoconductive belt 10 is made from a photoconductive material coated on a ground layer, which, in turn, is coated on a flexible substrate with an anti-curl backing layer. The photoconductive material is made from a transport layer coated on a selenium generator layer. The transport layer transports positive charges from the generator layer. The generator layer is coated on an interface layer. The transport layer contains small molecules of di-m-tolydiphenylbiphenyldiamine dispersed in a polycarbonate. The generation layer is made form trigonal selenium. The grounding layer is made from a titanium coated Mylar. The ground layer is very thin and allows light to pass therethrough. Other suitable photoconductive materials, ground layers, and and anti-curl substrates may also be employed. Belt 10 moves in the direction of arrow 12 to advance successive portions of the photoconductive surface sequentially through the various processing stations disposed about the path of movement thereof. Belt 10 is entrained about stripping roller 14, tensioning roller 16, idler rollers 18, and drive roller 20. Stripping roller 14 and idler rollers 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices, indicating generally by the reference numerals 22 and 24 charge the photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

After photoconductive belt 10 is charged, light source 25 is selectively energized to discharge the charge therefrom in selected nonimage regions. The details of the structure and operation of light source 25 will be described hereinafter with reference to FIGS. 2 through 4, inclusive.

With continued reference to FIG. 1, the charged portion of the photoconductive belt 10 is advanced through imaging station B. At imaging station B, a document handling unit, indicated generally by the reference numeral 26, is positioned over platen 28 of the printing machine. Document handling unit 26 sequentially feeds documents from a stack of documents placed by the operator in the document stacking and holding tray. The original documents to be copied are loaded face up into the document tray on top of the document handling unit. A document feeder located below the trap forwards the bottom document in the stack to rollers. The rollers advance the document onto platen 28. When the original document is properly positioned on platen 28, a belt transport is lowered onto the platen with the original document being interposed between the platen and the belt transport. After imaging, the original document is returned to the document tray from platen 28 by either of two paths. If a simplex copy is being made or if this is the first pass of a duplex copy, the original document is returned to the document tray via the simplex path. If this is the inversion pass of a duplex copy, then the original document is returned to the document tray through the duplex path. Imaging of a document is achieved by two Xenon flash lamps 30 mounted in the optics cavity which illuminate the document on platen 28. Light rays reflected from the document are transmitted through lens 32. Lens 32 focuses light images of the original document onto the charged portion of the photoconductive surface of belt 10 to selectively dissipate the charge thereon. This records an electrostatic latent image on the photoconductive surface which corresponds to the informational areas contained within the original document. Thereafter, belt 10 advances the electrostatic latent image recorded on the photoconductive surface to development station C.

At development station C, a magnetic brush developer unit, indicated generally by the reference numeral 34, has three developer rolls, indicated generally by the reference numerals 36, 38 and 40. A paddle wheel 42 picks up developer material and delivers it to the developer rolls. When developer material reaches rolls 36 and 38, it is magnetically split between the rolls with half the developer material being delivered to each roll. Photoconductive belt 10 is partially wrapped about rolls 36 and 38 to form extended development zones. Developer roll 40 is a cleanup roll. Magnetic roll 44 is a carrier granule removal device adapted to remove any carrier granules adhering to belt 10. Thus, rolls 36 and 38 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10. Conveyor 50 advances the copy sheet to fusing station E.

Fusing station E includes a fuser assembly, indicated generally by the reference numeral 52 which permanently affixes the transferred toner powder image to the copy sheet. Preferably, fuser assembly 52 includes a heated fuser roller 54 and a pressure roller 56 with the powder image on the copy sheet contacting fuser roller 54. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfer to a donor roll and then to the fuser roll.

After fusing, the copy sheets are fed through a decurler 58. Decurler 58 bends the copy sheet in one direction to put a known curl in the copy sheet and then bends it in the opposite direction to remove that curl.

Forwarding rollers 60 then advance the sheet to duplex turn roll 62. Duplex solenoid gate 64 diverts the sheet to the finishing station F or to duplex tray 66. The duplex tray 66 provides an intermediate or buffer storage for those sheets that have been printed on one side and on which an image will be subsequently printed on the second, opposed side thereof, i.e. the sheets being duplexed. The sheets are stacked in duplex tray 66 face down on top of one another in the order in which they are copied.

In order to complete duplex copying, the simplex sheets in tray 66 are fed, in seriatim, by bottom feeder 68 from tray 66 back to transfer station D via conveyor 70 and rollers 72 for transfer of the toner powder image to the opposed sides of the copy sheets. Inasmuch as successive bottom sheets are fed from duplex tray 66, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from the secondary tray 74. The secondary tray 74 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 76. Sheet feeder 76 is a friction retard feeder utilizing a feed belt and take-away rolls to advance successive copy sheets to transport 70 which advances the sheets to rolls 72 and then to transfer station D.

Copy sheets may also be fed to transfer station D from the auxiliary tray 78. The auxiliary tray 78 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 80. Sheet feeder 80 is a friction retard feeder utilizing a feed belt and take-away rolls to advance successive copy sheets to transport 70 which advances the sheets to rolls 72 and then to transfer station D.

Secondary tray 74 and auxiliary tray 78 are secondary sources of copy sheets. A high capacity feeder, indicated generally by the reference numeral 82, is the primary source of copy sheets. High capacity feeder 82 includes a tray 84 supported on an elevator 86. The elevator is driven by a bidirectional motor to move the tray up or down. In the up position, the copy sheets are advanced from the tray to transfer station D. A vacuum feed belt 88 feeds successive uppermost sheets from the stack to a take away drive roll 90 and idler roll 92. The drive roll and idler rolls guide the sheet onto transport 94. Transport 94 and idler roll 96 advance the sheet to rolls 72 which, in turn, move the sheet to transfer station station D.

Invariably, after the copy sheet is separated from the photoconductive surface of belt 10, some residual particles remain adhering thereto. After transfer, photoconductive belt 10 passes beneath corona generating device 98 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 100 and two de-toning rolls 102 and 104, i.e. the waste and reclaim de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the the rear of cleaning station G.

The various machine functions are regulated by a controller. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet paths sensors or switches may be utilized to keep track of the position of the documents and the copy sheets. In addition, the controller regulates the various positions of the gates depending upon the mode of operation selected.

Figure 2:
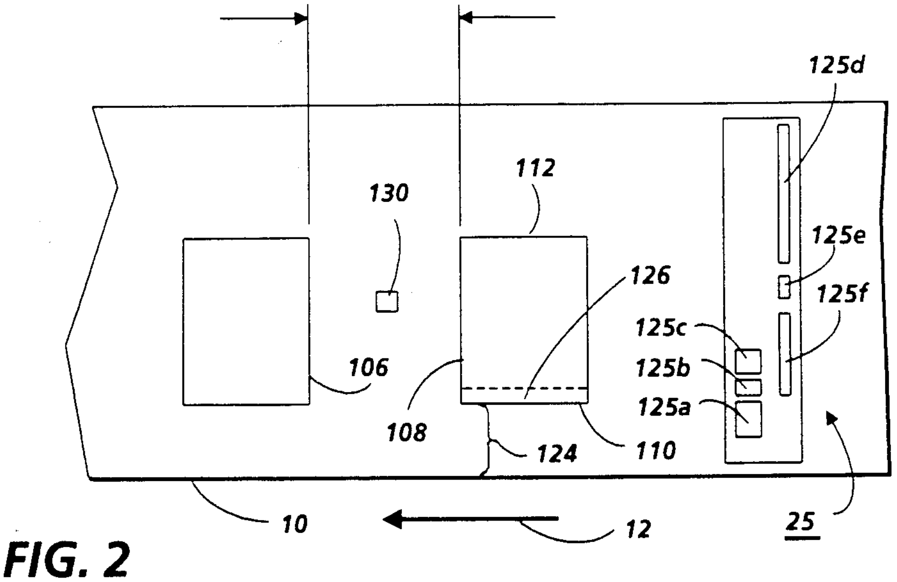
FIG. 2 is a schematic plan view showing the operation of the erase lamp used in the FIG. 1 printing machine.

Referring now to FIG. 2, the general operation of light source 25 will be described. Light source or lamp 25 is positioned to have its longitudinal axis extending in a direction substantially perpendicular to the direction of movement of belt 10 as indicated by arrow 12. In this way, lamp 25 erases unwanted charge between the trail edge 106 of one image frame and the lead edge 108 of the next image frame, as well as between the side edges 110 and 112 of the image frame and the respective sides of the photoconductive belt. Lamp 25 is segmented, and the segments are used to selectively erase charged areas. Segment **125*a* discharges the outboard edge of the photoconductive belt to the registration edge of latent image recorded thereon. Segment 125*b* discharges 2 millimeters of the image frame to eliminate any registration line on the copy. Segment 125*c* discharges the region of the image frame wherein the holes of a computer form feed document are recorded. Energization of segments 125*d*, 125*e* and 125*f* erase the charge in the interdocument area, i.e. between trail edge 106 and lead edge 108. Segment 125*e* is turned on for erase and off to enable a charged test patch in the interdocument area. Segments 125*d* and 125*f*** are electrically connected to one another so as to be turned on and off in unison and are only used to erase the charge in the interdocument area.

Figure 3:
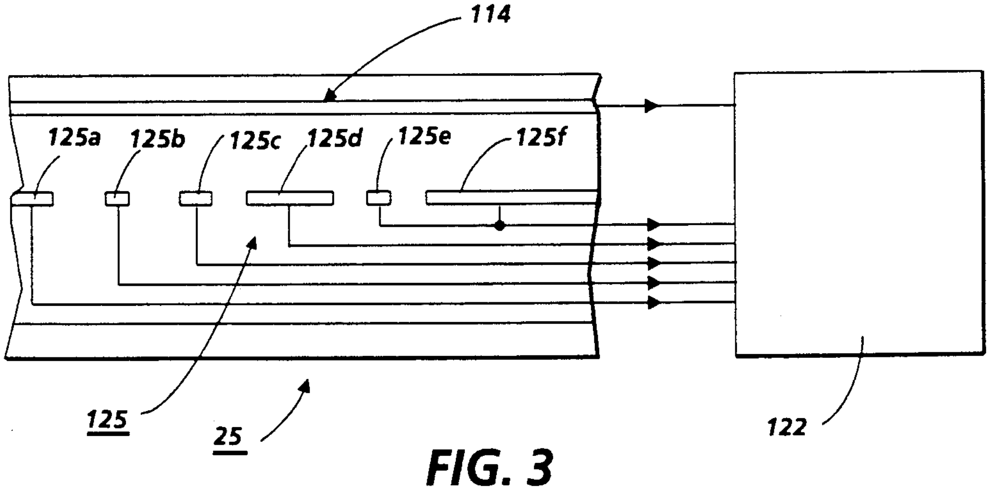
FIG. 3 is a fragmentary, schematic sectional elevational view further illuminating the FIG. 2 erase lamp.
Figure 4:
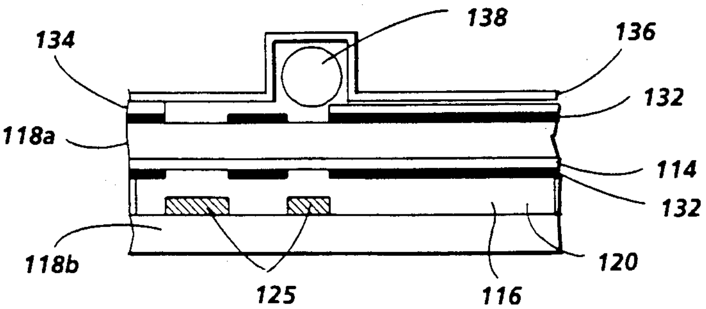
FIG. 4 is a schematic sectional elevational view of the FIG. 2 erase lamp.

Turning now to FIGS. 3 and 4, lamp 25 is an AC plasma lamp. The lamp is made from a substantially transparent housing, indicated generally by the reference numeral 118, defining a chamber 120. Housing 118 is made from two pieces of glass **118*a* and 118*b* sandwiched together and sealed around the edges with a glass frit, leaving a small gap therebetween. Two dielectric coated electrodes indicated generally by the reference numeral 114 and 125 separated by a gaseous medium 116 are located in chamber 120 of housing 118. Gaseous medium 116 is a plasma gas, i.e. a charged gas, and is preferably a neon gas. Electrode 114 is continuous on the chamber side of glass 118*a* and substantially transparent. Electrode 125, which is coated on the chamber side of glass 118*b*, is segmented. Therefore the electrodes are spaced from one another with gaseous medium 116 being interposed therebetween. The operation of lamp 25 is analogous to that of a capacitor. When voltage is applied to the lamp, the charge that flows through the gas between the electrodes will light the lamp. When the electroddes are fully charged, the current stops and the light will turn off. If the lamp is discharged, or the polarity of the voltage is reversed, charge will again flow, and the lamp will light. In order to control the lamp a periodically changing voltage is applied to the desired segment. The frequency of the voltage determines the intensity of the light. Ionization of the neon gas occurs when a voltage of from about 150 volts to about 400 volts is applied between the electrodes. Light rays are emitted only during a voltage change. Since light rays are emitted during the transient changes of applied voltage, the light power is proportional to the repetition rate. For an electrophotographic printing machine, regulation of the voltage has to be at least 2% for both line and load variation. Linear intensity control for 20% to 100% fron an analog control voltage of 0 to 10 volts DC is employed. The minimum repetition rate has to be greater than 4 kilo hertz to enable rapid turn on and turn off. This is achieved by the utilization of pulsed DC voltage supply 122. Voltage supply 122 charges the selected segments of lamp 25 with 300 volts from a well regulated, precision power supply, through a current limiting resistor to avoid overload. Once at equilibrium charge, the lamp segment is quickly discharged through a low value resistor. Each time this cycle is repeated, a pulse of light is observed during the discharge transient. If the switching function is performed at a repetition rate of from 4 to 20 kilo hertz and the resistor values are such that the discharge pulse is short, from 1 to 5 micro seconds, and not repeated until the lamp has been fully retracted, a substantially linear relationship exists between the light output and the frequency. The switch requirement for speed and low impedance may be achieved by power MOSFETS. Each segment is independently energized and is of a different shape and area. Therefore, each output requires a specific combination of resistors to equalize the light power integrated over the segment width. In addition to the switching function, voltage supply 122 has a well regulated DC to DC converter from 24 to 300 volts and a voltage controlled oscillator with an output of from 4 to 20 kilo hertz from an analog control voltage of from 0 to 10 volts DC. The converter has a constant frequency, 25 kilo hertz, switching supply circuit and pulse width modulation control. The charge and discharge current is customized for a particular segment to equalize the integrated light power. Changing the frequency changes the output level of all the segments together. Normally this level is adjusted whenever belt 10 is replaced. At this time the level is adjusted so that photoconductive belt 10 is discharged by lamp 25 to the same level as from the exposure station. Selected segments of segmented electrode 125 are enabled by the control logic. The enable signal is combined with the pulse waveform from the voltage controlled oscillator in a NOR gate that drives a field effect transistor controlling that segment. In this way, the field effect transistor modulates the DC voltage of the selected segment. Segment 125***a* is positioned at one end of lamp 25 and discharges the area from one edge of photoconductive belt 10 to the registration edge of the image, i.e. region 124 (FIG. 2). Segment 125*b* extends inwardly from one end of segment 125*a* toward the other end of the lamp to discharge 2 millimeters of the edge of the image, i.e. region 126 (FIG. 2). Segment 125*c* extends inwardly from the other end of segment 125*b* toward the other end of the lamp to discharge region 128 (FIG. 2) of the image, i.e the region where the holes of a computer form feed document are recorded. Segments 125*d* and 125*f* are electrically connected to one another inside lamp 25. These segments discharge the interdocument area. The segments are turned on after the trail edge 106 (FIG. 2) of the image frame and off before the lead edge 108 (FIG. 2) of the next image frame. Segment 125*f* extends inwardly from one end of segment 125*a* toward the other end of lamp 25. Segment 125*d* extends inwardly from the other end of lamp 25 toward the other end of segment 125*f*. Segment 125*e* is interposed between segments 125*d* and 125*f*. Segment 125*e* is turned on and then off to form a charge patch 130 (FIG. 2) in the interdocument area. This patch is used for controlling the concentration of toner particles in the developer material, the charge level on the photoconductive belt and to characterize the photo induced discharge sensitivity of the photoconductive belt. The latter function is accomplished by circuitry in the power supply that, when enabled, causes the frequency to the patch segment to be exactly one half of that determined by the analog control voltage.

Now referring to FIG. 4, an aperture 132 is coated on lamp 25. Adhesive 134 is used to secure a lens cover 136 to lamp 25 over aperture 132. Lens 138 is retained in lens cover 136 and functions to focus the light rays emitted by the ionization of the neon gas sandwiched between segments 125*d*, 125*e* and 125*f* and electrode 114.

In recapitulation, the erase lamp of the present invention has a continuous electrode positioned adjacent a segmented electrode with a neon gas being interposed therebetween. The electrodes are coated on glass plates with the segmented electrode being selectively energizable by a pulsed DC voltage source. In this way, selected regions of the light source are ionized causing light rays to be emitted in selected areas. These light rays erase the charge on the photoconductive member in the selected regions.

It is, therefore, evident that there has been provided, in accordance with the present invention, an erase lamp that fully satisfies the aims and advantages hereinbefore set forth. While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A lamp system for erasing selected portions of an electrically charged photoconductive member, including:

a substantially transparent housing defining a chamber;

a gaseous medium disposed in the chamber of said housing;

a pair of spaced electrodes disposed in the chamber of said housing, said pair of electrodes comprising a continuous electrode and a segmented electrode spaced from said continuous electrode with at least a portion of the gaseous medium being interposed therebetween;

a DC voltage source; and circuit means, coupled to said DC voltage source and said pair of spaced electrodes, for inducing a series of pulsed discharges between at least one of said segments of said segmented electrode and said continuous electrode to ionize said gaseous medium in a selected region causing said gaseous medium medium to emit light thereat so as to illuminate the electrically charged photoconductive member in the selected region to discharge the charge thereat.

2. A lamp system according to claim 1, wherein:

said housing includes at least two glass surfaces with said gaseous medium being interposed therebetween;

said continuous electrode includes a substantially transparent, dielectric material overlay coated on one of said glass surfaces; and said segmented electrode includes a dielectric material overlay coated in segments on the other of said glass surfaces.

3. A lamp system according to claim 2, wherein said segmented electrode includes a first segment positioned at one end of the lamp for discharging one edge of the charged area the photoconductive member.

4. A lamp system according to claim 3, wherein said segmented electrode includes a second segment having one end adjacent said first segment extending inwardly toward said other end of the lamp so as to discharge a border area of the photoconductive member.

5. A lamp system according to claim 4, wherein said segmented electrode includes:

a third segment extending inwardly from one end of said first segment toward the other end of the lamp;

a fourth segment having one end adjacent the other end of the lamp and extending inwardly toward said third segment; and a fifth segment interposed between said third segment and said fourth segment with said third segment and said fourth segment being energized simultaneously so as to discharge the region from one end of the photoconductive member to the edge of the other end of the photoconductive member with a charged strip being located therebetween, said fifth segment being adapted to discharge at least a portion of the charged strip to form a charged patch.

6. A lamp system according to claim 5, wherein said segmented electrode includes a sixth segment having one end thereof adjacent the other end of said second segment extending inwardly toward the other end of the lamp so as to discharge the photoconductive member in a narrow region between the border region and the other end thereof.

7. An electrophotographic printing machine of the type in which a light source is employed to discharge selected portions of a charged photoconductive member adapted to have successive electrostatic latent images of original documents being reproduced recorded thereon, wherein the improved light source includes:

a substantially transparent housing defining a chamber;

a gaseous medium disposed in the chamber of said housing;

a pair of spaced electrodes disposed in the chamber of said housing, said pair of electrodes comprising a continuous electrode and a segmented electrode spaced from said continuous electrode with at least a portion of the gaseous medium being interposed therebetween;

a DC voltage source; and circuit means, coupled to said DC voltage source and said pair of spaced electrodes, for inducing a series of pulsed-discharges between at least one of said segments of said segmented electrode and said continuous electrode to ionize said gaseous medium in a selected region causing said gaseous medium to emit light thereat so as to illuminate the electrically charged photoconductive member in the selected region to discharge the charge thereat.

8. A printing machine according to claim 7, wherein:

said housing includes at least two glass surfaces with said gaseous medium being interposed therebetween;

said continuous electrode includes a substantially transparent, dielectric material overlay coated on one of said glass surfaces; and said segmented electrode includes a dielectric material overlay coated in segments on the other of said glass surfaces.

9. A printing machine according to claim 8, wherein said segmented electrode includes a first segment positioned at one end of the lamp for discharging the area from one edge of photoconductive member to the adjacent edge of the electrostatic latent image recorded thereon.

10. A printing machine according to claim 9, wherein said segmented electrode includes a second segment having one end adjacent said first segment extending inwardly toward said other end of the lamp so as to discharge the border area of the electrostatic latent image recorded on the photoconductive member.

11. A printing machine according to claim 10, wherein said segmented electrode includes:

a third segment extending inwardly from one end of said first segment toward the other end of the lamp;

a fourth segment having one end adjacent the other end of the lamp and extending inwardly toward said third segment; and a fifth segment interposed between said third segment and said fourth segment with said third segment and said fourth segment being energized simultaneously so as to discharge the region from one end of the photoconductive member to the edge of the other end of the photoconductive member with a charged strip being located therebetween, said fifth segment being adapted to discharge at least a portion of the charged strip to form a charged patch.

12. A printing machine according to claim 11, wherein said segmented electrode includes a sixth segment having one end thereof adjacent the other end of said second segment extending inwardly toward the other end of the lamp so as to discharge the photoconductive member in a narrow region between the border region and the other end thereof where holes of a electrostatic latent image corresponding to a computer forms original document are generally recorded.

13. A printing machine according to claim 12, further including a lens adapted to focus the light rays emitted by the ionization of said gaseous medium from energization of said third segment, said fourth segment and said fifth onto the corresponding charged portions of said photoconductive member.

* * * * *